June 1, 1943. L. SIMONS 2,320,801
METHOD OF COATING METAL
Filed Oct. 3, 1940
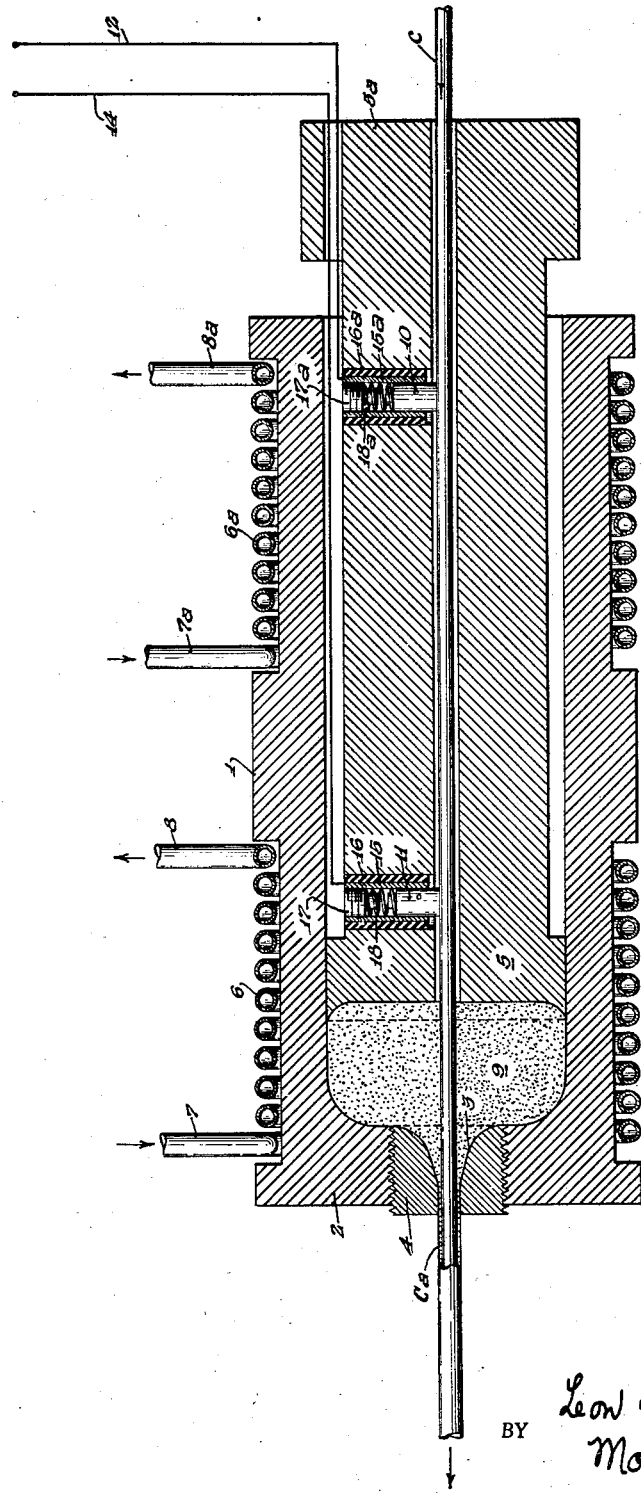
INVENTOR.
Leon Simons
BY Mock + Blum
ATTORNEYS Patented June 1, 1943

2,320,801

UNITED STATES PATENT OFFICE 2,320,801

METHOD OF COATING METAL

Leon Simons, New York, N. Y.

Application October 3, 1940, Serial No. 359,504

2 Claims. (Cl. 207—10)

My invention relates to a new and improved method for producing a core which is covered with a sleeve or coating or surface layer of a high-melting-point metal or alloy. This surface layer is preferably continuous and of substantially uniform thickness, but the coating surface layer may be discontinuous and of varying thickness.

The invention relates particularly to copper-clad wire, rod, and the like, although it is not limited to any particular materials or combinations of materials.

The core preferably consists of low-carbon steel which is paramagnetic so that said core can be heated by the hysteresis effect. However, said core may be made of any metal or of any alloy whose melting point is above the extrusion temperature of the surface layer. If the core is made of steel, said core may be treated, after the surface layer has been formed, so as to transform the steel core to the austenite stage. This type of steel is generally known in the trade as "austenitic steel." Austenite is a solid solution of FeC in gamma iron. Austenite can be obtained by quenching 1.50% carbon steel by means of water which has a suitable low temperature. Austenite also occurs in steel which contains 10% of manganese, and it also occurs in steel which contains 25% of nickel, after suitable slow cooling. The carbon content of the austenitic steel may be as high at 2%.

The outer covering or surface layer of said core is preferably resistant to corrosion and it may consist of copper or a copper alloy or any corrosion-resistant suitable metal or alloy which has a high-melting-point. The surface layer may be made of a metal or alloy which is not resistant to corrosion. Likewise the coating of the core may be formed in two or more layers. These coating layers may be formed of identical metals or alloys, or of different metals or alloys.

Another object of the invention is to produce copper-clad steel bodies or the like, at very low cost, by a direct extruding operation, using non-molten metal for producing the surface layer, thus eliminating the expense of melting large bodies of metal and congealing the molten metal around the core so as to provide a non-corrosive bond. According to my invention an efficient non-corrosive bond is secured between the core and the surface layer, without melting the metal or alloy which is used to make the surface layer. However, and as later explained herein, a thin surface layer of copper may be formed on the core by melting sufficient copper anterior the extrusion zone or at the inlet end of the extrusion zone, and congealing said molten copper against the outer surface of the core. A superior non-corrosive bond is thus secured between the steel core and the initial layer of copper which has been thus congealed. The initial copper layer which has been thus provided bonds readily with the main portion of the surface layer which is secured by extrusion.

Another object of the invention is to provide the main surface layer of the coating by an extrusion process which can be utilized within substantially wide limits of temperature, so that the crystal size of the coating metal or alloy can be readily controlled.

Another object of the invention is to control the crystal size and formation of the core itself, by forming the main surface layer within a suitable temperature range.

The coating material is preferably a metal or alloy whose melting point is at least 657° C., this being the melting point of aluminum. Metals or alloys whose respective melting points are substantially 657° C. or above, are designated as high-melting-point metals or alloys.

Other objects of my invention will be set forth in the following description and drawing which illustrate a preferred embodiment thereof, it being understood that the above statement of the objects of my invention is intended generally to explain the same and without limiting it in any manner.

The drawing diagrammatically illustrates an apparatus which can be used for practicing the invention.

Heretofore in making copper-clad steel wire or steel rod, the invariable large-scale commercial practice has been to pour molten copper into a mold, around a steel billet of relatively large diameter. The molten copper was thus congealed around the core, in order to form a jacket. It was then necessary to roll or otherwise work this composite billet down to size. This rolling operation is expensive because it is necessary to anneal the composite billet after one or two workings, as otherwise it becomes too hard for further working.

According to my invention, rod of relatively small diameter can be directly coated with the copper or the like by means of an extrusion process, so that the amount of working which is necessary to reduce the coated core to final size is greatly reduced, in addition to other advantages.

It has been well-known for many years to coat a steel core with metal or alloy of low-melting-point by an extrusion process, but such process has never been practical in coating with copper or its alloys of high-melting-point.

The drawing shows a cylinder 1 which is provided with a flange 2 at the front end thereof. This wall or flange 2 is provided with a tightly fitting and removable plug 4, which is connected to the wall or flange 2 by means of cooperating threads. The plug 4 is provided with a tapered outlet bore 3, which serves as an extrusion nozzle. The cylinder 1 is made of any suitable material which is preferably not paramagnetic, so that magnetic flux can readily pass through said wall to the interior of said cylinder. The cylinder 1 may be made of the so-called non-magnetic steel whose formula is 74% iron, 18% chromium, 8% nickel.

A piston 5 is movably located in the cylinder 1. This piston 5 is also preferably made of material which is non-paramagnetic.

A first hollow coil 6 is located around the outer wall of the cylinder 1. This coil 6 is connected to a suitable source of high-frequency alternating current of the type which is used in induction furnaces. The coil 6 is cooled in the conventional manner by forcing water or oil or other cooling medium through the same. This oil may be a non-conducting mineral oil. The drawing shows the inlet pipe 7 of the coil 6, and the outlet pipe 8 of said coil, through which water or oil or other cooling medium is forced. This coil 6 heats the entire extrusion zone and it may also be located partially anterior the extrusion zone, so as to heat the core C anterior the inlet or right-hand end of the extrusion zone.

As an example, the core C may be made of low-carbon steel, and said core may be steel rod whose diameter is 0.500 inch. The core C is preferably, but not necessarily, made of paramagnetic material. This core C is preferably sufficiently bendable or flexible so that it can be unwound from a suitable reel, and the finished material can also be wound on a suitable reel if desired.

A practical working example will be given in connection with the coating of the core C with a layer Ca of copper. The copper mass 9 is loaded into the cylinder 1 in the form of granules or powder or the like. It may consist of masses of any size, and it may also consist of an integral slug which fits snugly in the cylinder 1 and which is bored so as to make it possible to pass the core C through the same. The copper mass 9 is subjected to suitable extrusion pressure by means of the piston 5, which is actuated by hydraulic pressure or in any other suitable manner.

The melting point of pure copper is 1083° C. or approximately 1981° F.

Copper can be softened by heat, without melting the same, in order to enable the copper to be readily extruded under suitable pressure, at a temperature as low as 1300° F., thus affording a temperature range of more than 600° between the extrusion point and the melting point of the copper. The preferred temperature of the copper, during the extrusion thereof, is at or above 1600° F.

The supply of heat through the induction coil 6 is regulated so as to maintain the copper mass 9 at the extrusion temperature under the applied pressure. The pressure which is applied by the piston 5 may be as high as 50,000 pounds per square inch. Under said pressure and at said extrusion temperature, the copper is extruded in the form of a surface layer or jacket Ca.

The head 5a of the piston 5 serves as a stop because it is of greater outer diameter than the bore at the rear wall of the cylinder 1. Therefore, the extrusion is stopped before the mass of copper is used up.

In order to provide a superior non-corrosive bond between the extruded copper sleeve Ca and the core C, said core C may be given a very thin initial coating of copper or of other material, directly at the surface of said core, which is compatible with copper so that the extruded copper will form a non-corrosive 100% bond with the initial very thin layer of copper. The core C can be given a thin initial coating of copper either by electrolysis, or in any other suitable manner.

The core C may be additionally heated by a source of heat which is independent of the induction coil 6. For this purpose I have provided shoes 10 and 11 which contact respectively with the core C. The core C can slide readily relative to these shoes 10 and 11. The shoes 10 and 11 are held yieldingly against the core C by respective springs 18a and 18.

The single shoe 10 may be replaced by any suitable number of shoes which are arranged circumferentially around the core C in order to equalize their pressure and the same may be done with the shoe 11. The shoes 10 and 11 are connected by means of respective wires 12 and 14 to any suitable source of current which may be direct current or alternating current of any frequency.

The shoes 10 and 11 are preferably made of graphite or any other suitable material of high-melting-point.

The shoes 10 and 11 are preferably located in lateral bores of the piston 5, and said shoes are insulated from the piston 5. Said shoes are located slidably in respective metal bushings 15 and 15a, which are respectively located in bushings 16 and 16a, which are made of a suitable refractory insulating material. Each of the metal bushings 15 and 15a is thus electrically insulated from the piston 5. The outer ends of the respective metal bushings 15 and 15a are closed by means of respective removable plugs 17 and 17a, and said shoes are respectively provided with springs 18 and 18a which force the respective shoe inwardly against the adjacent portion of the surface of the core C.

Of course the coil 6 is suitably insulated from the cylinder 1, either by spacing the coil 6 from the cylinder 1, or in any suitable manner. It is preferred to insulate the coil 6 from the cylinder 1, merely by spacing the same from each other.

The high-frequency current of the coil 6 rapidly heats that part of the core C which is located in the extrusion zone, and it also heats a part of the core C which is anterior the extrusion zone. This heating is due partially to eddy currents, and it is due partially to the rapidly alternating hysteresis effect which is produced by the high-frequency alternating magnetic flux which is passed through the respective part of the core C. The indirect heating which is thus secured is sufficient to maintain that part of the core C which is advanced through the extrusion zone, at the desired temperature. The temperature of the core in the extrusion zone may be from 1300° F. to 1900° F. The temperature of the core in the extrusion zone is preferably not less than 1600° F., and save for the exception later stated herein, the temperature of the core in the extrusion zone is preferably below the melting point of the copper. Therefore, the jacket Ca is formed substantially by the extrusion of non-molten copper.

However, the temperature of the core in the extrusion zone may be equal to the melting point of the copper and even a little above the melting point of the copper, as long as the latent heat of the core in the extrusion zone is insufficient to melt the main mass of the copper in the extrusion zone. As the core is thus advanced continuously through the extrusion zone, a thin layer of molten copper may be formed directly at the surface of the core, but the main mass of the jacket is formed by extrusion of the non-molten copper.

The frequency of the current which is supplied to the coil 6 through its cooled leads, is of the usual frequency which is used in high-frequency induction furnaces. The wattage of the current which is supplied to the coil 6 necessarily depends upon the size of the apparatus and other variable factors, such as the cross-sectional diameter of the core, the cross-sectional diameter of the copper mass and iron, etc.

The eddy current which is induced by the coil 6 also heats the cylinder 1, the copper mass 9, and the piston 5. The copper is thus heated by the coil 6 to the extrusion temperature, but not above the melting point.

The core C is pulled or pushed continuously through the extrusion zone, at a regulated rate, so that said core is maintained at the extrusion temperature within the extrusion zone.

However, the core may have a temperature gradient within the extrusion zone, so that the core has a higher temperature at the inlet end of the extrusion zone than at the outlet or left-hand end of the extrusion zone. For this purpose the core and its jacket may be suitably cooled externally to the plug 4.

The part of the core C which contacts with the copper at the inlet end of the extrusion zone may thus be maintained at a temperature which is equal to the melting point of the copper or above the melting point of the copper, and the part of the core which is located adjacent and at the outlet end of the extrusion zone may have a temperature which is less than the melting point of the copper but which is within the limits of the extrusion temperature. The core C and its jacket Ca are preferably maintained at a temperature of about 1600° F., as said core and jacket pass out of the nozzle 3 of the plug 4. The core and its jacket are then cooled externally to the outlet end of the extrusion zone, so as to produce the austenite in the steel core C.

The supplementary coil 6a is of the same type as the coil 6, and said coils 6 and 6a may be supplied with current from the same source. The pipes 7a and 8a correspond respectively to the pipes 7 and 8. The coil 6a may supplement the action of the heating current which is supplied to the shoes 10 and 11, or it may replace said shoes 10 and 11, which can be omitted from the apparatus. The coil 6a heats the core C anterior the extrusion zone. The heat which is supplied by the coil 6 can therefore be sufficient merely to maintain the copper in the extrusion zone at the desired extrusion temperature. The coil 6a heats the adjacent part of the core C to a temperature which may be equal to or above the melting point of the copper. The additional heat which is thus supplied to the core C, anterior the extrusion zone, and which raises the temperature of the respective part of the core above the melting point of the copper, is merely sufficient to melt enough copper to form a very thin initial layer which congeals very close to the inlet or right-hand end of the extrusion zone.

During the extrusion, the core C is preferably insulated from the ground, by mounting the magazine reel and the take-up reel on insulated supports. The drawing shows a copper mass 9 of greater cross-sectional diameter than the cross-sectional diameter of the core C, but this relation may be reversed, or said diameters may be equal.

By supplying a heating current through the wires 14 and 15, or in any other manner, or due to the hysteresis effect alone, the temperature of the core C in the extrusion zone may be above the temperature of the copper in said extrusion zone. The temperature of the core in the extrusion zone may be less than or equal to or even above the melting point of the copper, thus melting the copper directly at the surface of the core in the extrusion zone to form a very thin initial layer which congeals against the core anterior the nozzle 3, while substantially all the copper in the extrusion zone is non-molten.

If the copper is thus melted directly adjacent the core or against a part of the core in the extrusion zone, the outflow of the copper in molten form through the tip of the extrusion nozzle is prevented, because the copper jacket or layer congeals to solid jacket form before passing out of the nozzle 3, and preferably before entering the nozzle 3.

The latent heat of the molten copper at and adjacent the inner or right-hand end of the nozzle 3 is readily and rapidly dissipated through the plug 4 and the wall of the cylinder 1. Cooling means, such as a jet of water or oil or gas can be used to cool the jacketed core, external to the nozzle 3, or the plug 4 may be directly cooled, in order to prevent molten metal from passing out of the nozzle. The temperature of the copper mass may be higher at the inlet end of the extrusion zone than at the outlet end thereof, if the extrusion zone is of sufficient axial length, and the copper at the outlet end of said zone is thus cooled. The core can fit snugly in the bore of cylinder 5.

The surface of the core need not be coated with copper by electrolysis or the like, prior to passing the core through the extrusion zone, as this is optional.

The surface which is to be coated in the extrusion zone must be very clean, and free from oil or the like.

A thin coating of copper which has been melted and then congealed is thus formed against the core, anterior the outlet end of the extrusion zone, and the major part of the coating is formed by extrusion in the rest of the extrusion zone.

The jacketed core may be cooled external to the plug 4, by a spray of water or other cooling agent.

The use of an induction coil is preferred because it enables convenient and accurate regulation of the heat, and because the hysteresis effect makes it possible to maintain a paramagnetic core at a higher temperature than non-paramagnetic coating material.

The core C may be of any desired length and thickness, and it may be a relatively short and rigid rod, of the kind which is used in lightning arresters and the like.

It is thus possible in some cases to produce an article of finished size by means of the extrusion apparatus. However, it is preferred to mechanically work the coated core, to an extent sufficient to produce the desired crystal formation in the copper. This mechanical work is done in the cold, by rolling or drawing, since cold-working produces the desired crystal formation.

The fit of the core in the bore of the piston should be sufficiently tight to prevent any reverse flow of the solid or molten copper. The inlet or right-hand end of the bore of the piston may be tapered so as to act like a die, and slightly reduce the core C at said inlet end, producing the desired close but sliding fit of the core in the bore of the piston.

The drawing is wholly diagrammatic and it is not intended to be to scale. The axial length of the extrusion zone which is filled by the copper mass 9 may greatly exceed the transverse diameter of said space. The portion of the core which thus contacts with the couper in the extrusion zone or space, can thus be made sufficiently long to provide the desired temperature gradient, whereby either the core or the copper, or the core and the copper, are at a higher temperature at the inlet or right-hand end of the extrusion zone than at the outlet or left-hand end of said extrusion zone. For this purpose the extrusion is stopped before the mass of copper in the extrusion zone has been forced completely out of said zone, and while maintaining said temperature gradient. The longitudinal axis of the apparatus may be vertical and the extrusion nozzle may be at the bottom of said apparatus, in order to facilitate the removal of the piston from the cylinder, in order to insert a new charge of copper to be extruded.

While the invention relates particularly to forming a surface layer or coating from metals which have high-melting points, the invention is broad enough, in certain of its aspects, to cover the use of metals or alloys of relatively low-melting points.

It is one of the advantages of the process that the steel which passes out of the extrusion zone is at a suitable temperature, about 1600° F., so that the steel can be cooled to produce the austenitic stage.

If the core has a diameter of 0.500 inch, the core and its jacket can be subjected to the usual cold working to an extent sufficient to diminish the diameter of the core to .460 inch without annealing the core. This cold working gives the crystals of the copper the desired size and formation. By forming the jacket by extrusion on a core of sufficiently small diameter, the core can be reduced to convenient commercial size without the necessity of stopping the cold working in order to anneal the steel core, thus greatly diminishing the cost of production of the finished article.

While it is preferred to advance the core continuously through the extrusion zone, said movement of the core through the extrusion zone may be intermittent.

More than 90% of the jacket Ca is formed by extruding non-molten metal, and as much as 99% of the weight of the mass of the jacket C and even more, can be formed by extruding non molten metal.

The invention is by no means limited to a extrusion process because it is novel to heat th core to a temperature which is above the meltin point of the metal of the jacket, and to regulat the amount of heat which is supplied to the cor so as to form a thin initial bond of congeale molten metal, while the major part of the jacke remains in the non-molten condition during th connection of the jacket to the core.

Whenever I refer in the claims to coating metal core with covering metal, said coverin metal may be applied directly to the bare surfac of the core, or the core may have any desire intermediate non-metallic covering material.

The supply of alternating current to the coil is regulated by any suitable conventional mean so as to maintain the metal mass 9 in the non molten but extrudible condition.

I have shown a preferred embodiment of m invention, but it is clear that numerous change and omissions can be made without departin from its spirit.

I claim:

1. A method of covering a metal core with a sleeve of covering metal, which consists in advancing the core through an extrusion zone and while contacting the core with said covering metal in the extrusion zone, extruding the covering metal out of said extrusion zone in the form of a jacket around said core, heating the core in said extrusion zone by means of an electric current, indirectly heating the covering metal in said extrusion zone by means of said electric current to extrusion temperature while maintaining the covering metal which is located in said extrusion zone and which is spaced from the core at a temperature below the melting point of said covering metal.

2. A method of providing a paramagnetic core with a covering jacket of covering metal which is substantially non-paramagnetic, which consists in advancing the core through an extrusion zone in contact with the covering metal, heating the covering metal in said extrusion zone by means of eddy currents, also heating the core in said extrusion zone by means of eddy currents and hysteresis so that more heat is supplied to the core than to the covering metal in the extrusion zone, and forcing the major part of the covering metal in non-molten form out of said extrusion zone in the form of a jacket around said core.

LEON SIMONS.